US012749184B2

(12) United States Patent
Shafi et al.

(10) Patent No.: US 12,749,184 B2
(45) Date of Patent: Sep. 29, 2026

(54) METHOD AND SYSTEM FOR DETECTION OF RETINAL HEMORRHAGES USING HEAD COMPUTED TOMOGRAPHY

(71) Applicant: University of Tennessee Research Foundation, Memphis, TN (US)

(72) Inventors: Nadeem Shafi, Memphis, TN (US); Fatma Gunturkun, Memphis, TN (US); Berna Bakir Batu, Memphis, TN (US)

( * ) Notice: Subject to any disclaimer, the term of this patent is extended or adjusted under 35 U.S.C. 154(b) by 222 days.

(21) Appl. No.: 18/421,718

(22) Filed: Jan. 24, 2024

(65) Prior Publication Data

US 2024/0289950 A1 Aug. 29, 2024

Related U.S. Application Data

(60) Provisional application No. 63/440,863, filed on Jan. 24, 2023.

(51) Int. Cl.
*G06K 9/00* (2022.01)
*G06T 7/00* (2017.01)

(52) U.S. Cl.
CPC ........ *G06T 7/0012* (2013.01); *G06T 2207/20* (2013.01); *G06T 2207/30041* (2013.01)

(58) Field of Classification Search
CPC .................. G06T 2207/20; G06T 7/11; G06T 2207/20132; G06T 2207/30041; G06T 2207/10101; G06T 7/0012; G06T 2207/10081; G06V 2201/03; G06V 10/82; A61B 3/00; A61B 3/0025; A61B 3/102; A61B 6/501
See application file for complete search history.

(56) References Cited

U.S. PATENT DOCUMENTS

2016/0292856 A1* 10/2016 Niemeijer ........... G06F 18/2148
2024/0071063 A1* 2/2024 Cheung .............. G06V 10/7715

OTHER PUBLICATIONS

Umapathy, L., Winegar, B., MacKinnon, L., Hill, M., Altbach, M. I., Miller, J. M., & Bilgin, A. (2020). Fully automated segmentation of globes for volume quantification in CT images of orbits using deep learning. American Journal of Neuroradiology, 41(6), 1061-1069. (Year: 2020).*

* cited by examiner

*Primary Examiner* — Gregory A Morse
*Assistant Examiner* — Kevin M Coomber
(74) *Attorney, Agent, or Firm* — James Parrett, Esq.

(57) ABSTRACT

A method and system for detection of retinal hemorrhages using head computed tomography incorporating deep learning includes obtaining a patient head computed tomography image, segmenting globes using a deep-learning model, rotating the scans using the angle between globes, cropping and masking the globes, and stacking the globes to form 3D individual images that are analyzed for presence of retinal hemorrhage.

7 Claims, 6 Drawing Sheets

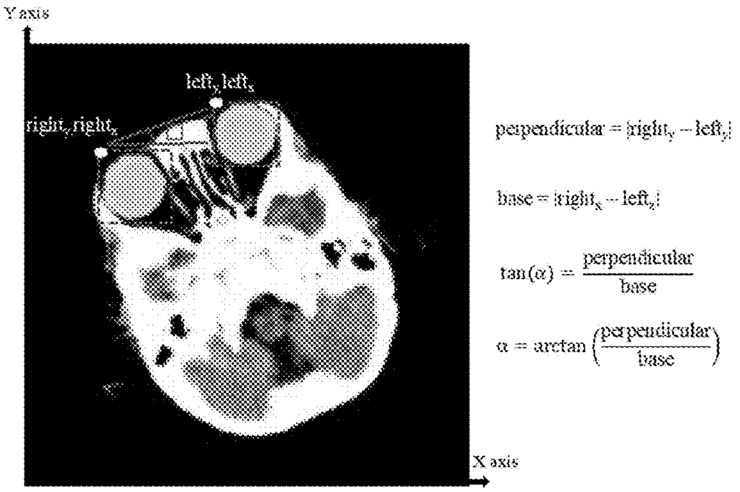
FIG. 4
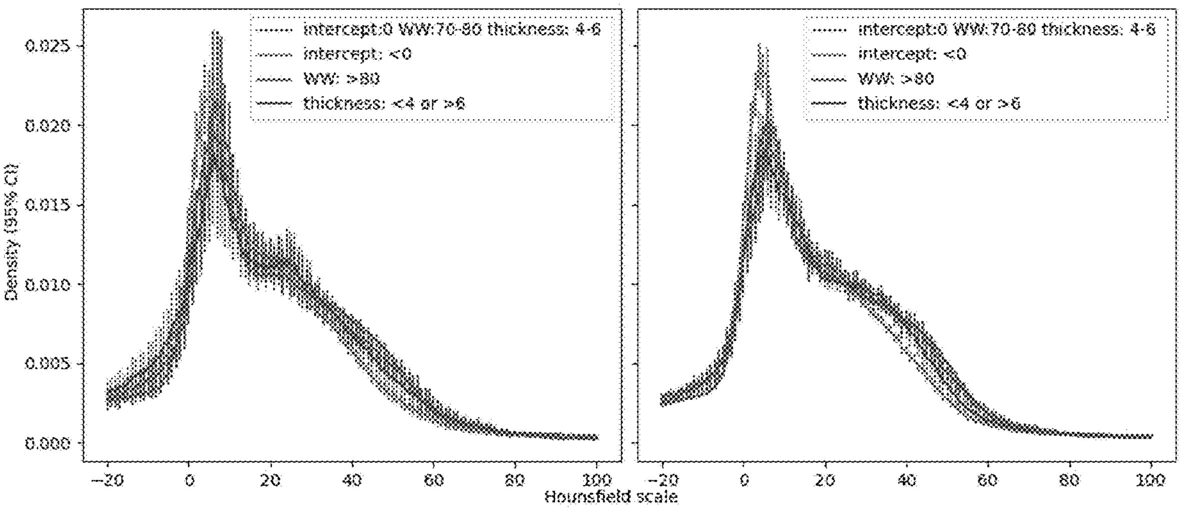
FIG. 5A
FIG. 5B

METHOD AND SYSTEM FOR DETECTION OF RETINAL HEMORRHAGES USING HEAD COMPUTED TOMOGRAPHY

CROSS REFERENCE TO RELATED APPLICATION

This application claims the benefit of U.S. Provisional Patent Application Ser. No. 63/440,863, filed Jan. 24, 2023, which is incorporated herein by reference.

TECHNICAL FIELD

This invention relates generally to the field of artificial intelligence, and discloses a method and system for classifying retinal hemorrhages using patient head computed tomography scans analyzed utilizing a novel deep learning model.

BACKGROUND

Abusive head trauma (AHT) in infants and young children is associated with up to 25% mortality and 40% severe disability among survivors. Victims of AHT can present with misleading histories and a range of symptoms, such as vomiting and irritability that overlap with common pediatric illnesses.[1] As a result, 25-31% of children with AHT are missed despite being evaluated in medical settings.[1]

Head computed tomography (CT) is commonly obtained in emergency departments to screen symptomatic infants and young children for a range of intracranial abnormalities, including AHT. However, retinal hemorrhages (RHs), which correlate strongly with AHT,[2] currently cannot be identified on this imaging modality in children unless they are exceptionally large. Screening for retinal hemorrhage (RH) is an essential part of an AHT assessment and requires a dilated fundoscopic exam after pediatric ophthalmology consultation. This subspecialty is not readily available in many communities. Furthermore, the exam is uncomfortable and can require sedation, and it temporarily nullifies pupillary response as an indication of neurological status.[3,4] Thus, whereas head CTs are obtained routinely, dilated fundoscopic exams are reserved for those patients who engender the highest suspicions of abuse.

Artificial intelligence (AI)-based image analysis has not been previously reported for the evaluation of retinal pathologies, though it has been employed with head CTs to classify intracranial hemorrhage subtypes[5,6] and even to predict 6-month outcomes in pediatric traumatic brain injury.[7] The potential for AI to contribute to diagnostic imaging in AHT by offering predictive analytics, clinical decision support, and image analysis has been previously recognized.[8] Because computer vision can discern features that are otherwise inapparent to human visual examination, a method and system of AI-based analysis of the ocular globes on pediatric head CTs was developed that can predict the presence and absence of RH.

SUMMARY

Retinal hemorrhages are rarely detected by radiologists on pediatric head CTs. The present invention describes the development of an AI-based model that can detect RHs otherwise not visible to the naked eye with a sensitivity of no less than 79.6%, specificity of no less than 79.2%, positive predictive value of no less than 68.6%, negative predictive value of no less than 87.1%, and area under the curve (AUC) of no less than 0.83. The AUC was as high as 0.94 on a subset of patients. The findings described herein demonstrate that RH information is accessible on head CTs, and that application of an AI-based model can enable earlier detection. In the course of this work, a novel method of re-orienting head CTs horizontally was developed, improved upon an existing adult globe segmentation strategy and demonstrated its applicability to pediatric scans. By screening pediatric head CTs for RHs, an AI-based system can assist clinicians in calibrating clinical suspicion for AHT, provide decision support for which patients need fundoscopic exams, and help involve child protection agencies in a timely manner when ophthalmologic services are not readily available.

Thus, the present application discloses a novel method and system for the automated detection of retinal hemorrhage in patients through the utilization of computed tomography (CT) scans. The technology involves a multi-step process designed to enhance the accuracy and efficiency of identifying retinal hemorrhages in 3D reconstructions of ocular globes. The system begins by capturing multiple computed tomography scans of patient heads, focusing on the ocular region. Subsequently, advanced image processing techniques are applied to isolate and extract the ocular globes from the acquired scans. To ensure optimal alignment and centering, the isolated globes are systematically rotated. Innovation lies in the extraction of high-resolution 2D images from the aligned and centered globes. These 2D images are then stacked to generate a comprehensive 3D representation of the ocular globes, facilitating a detailed examination of the retinal structure. The final stage of the process involves an automated assessment of the 3D image for the presence of retinal hemorrhages. Advanced algorithms analyze the volumetric data, identifying abnormalities indicative of retinal hemorrhages with high precision.

This groundbreaking technology offers significant advantages in terms of speed, accuracy, and non-invasiveness in detecting retinal hemorrhages. It is poised to revolutionize the field of medical imaging, providing healthcare professionals with a valuable tool for early diagnosis and intervention in cases of ocular pathology. The potential applications extend to a wide range of medical settings, including ophthalmology, neurology, and emergency medicine, thereby contributing to improved patient outcomes and healthcare efficiency. AHT is a clinical diagnosis of exclusion that often requires child abuse experts to consider physical findings in the context of detailed histories and sometimes investigations of a child's social ecosystem by law enforcement and child protective services. AHT is not a diagnosis of imaging alone. The technical ability to discriminate RH on head CT would improve upon one of our most readily available and objective screening tools for abuse. It would calibrate the possibility of AHT, offer greater confidence to clinicians practicing in subspecialty-limited environments for moving an investigation forward, and potentially decrease the number of missed cases, all using a routine diagnostic modality that is blind to common clinical bias. Given that 23-84% of retinal exams conducted for abuse evaluation are positive for hemorrhages,[2,4] and that retinal examinations should be performed within forty-eight hours of presentation before resolution occurs,[27] AI-assisted RH detection on routine head CTs could offer timely decision support about who needs a direct fundoscopic exam. The technology would have to be incorporated into existing CT processing software to play this role optimally.

This Summary is neither intended nor should it be construed as being representative of the full extent and scope of the present disclosure. Moreover, references made herein to "the present disclosure," or aspects thereof, should be understood to mean certain embodiments of the present disclosure and should not necessarily be construed as limiting all embodiments to a particular description. The present disclosure is set forth in various levels of detail in this Summary as well as in the attached drawings and the Description of Embodiments and no limitation as to the scope of the present disclosure is intended by either the inclusion or non-inclusion of elements, components, etc. in this Summary. Additional aspects of the present disclosure will become more readily apparent from the Description of Embodiments, particularly when taken together with the drawings.

BRIEF DESCRIPTION OF FIGURES

FIG. 4 shows the calculation of the rotation angle to straighten the image.

FIG. 5A and FIG. 5B show the Hounsfield unit (HU) distributions of globes in patients with respect to CT parameter settings. FIG. 5A shows cases with retinal hemorrhage (RH) and FIG. 5B shows control cases with no retinal hemorrhage (RH).

FIG. 8A shows the posterior globe, where the model highlighted higher HU values consistent with blood (40-60) in positive cases and lower HU values around zero in negative cases. FIG. 8B shows the anterior globe with HU values opposite of that of the posterior globe.

DETAILED DESCRIPTION

Figure 1:
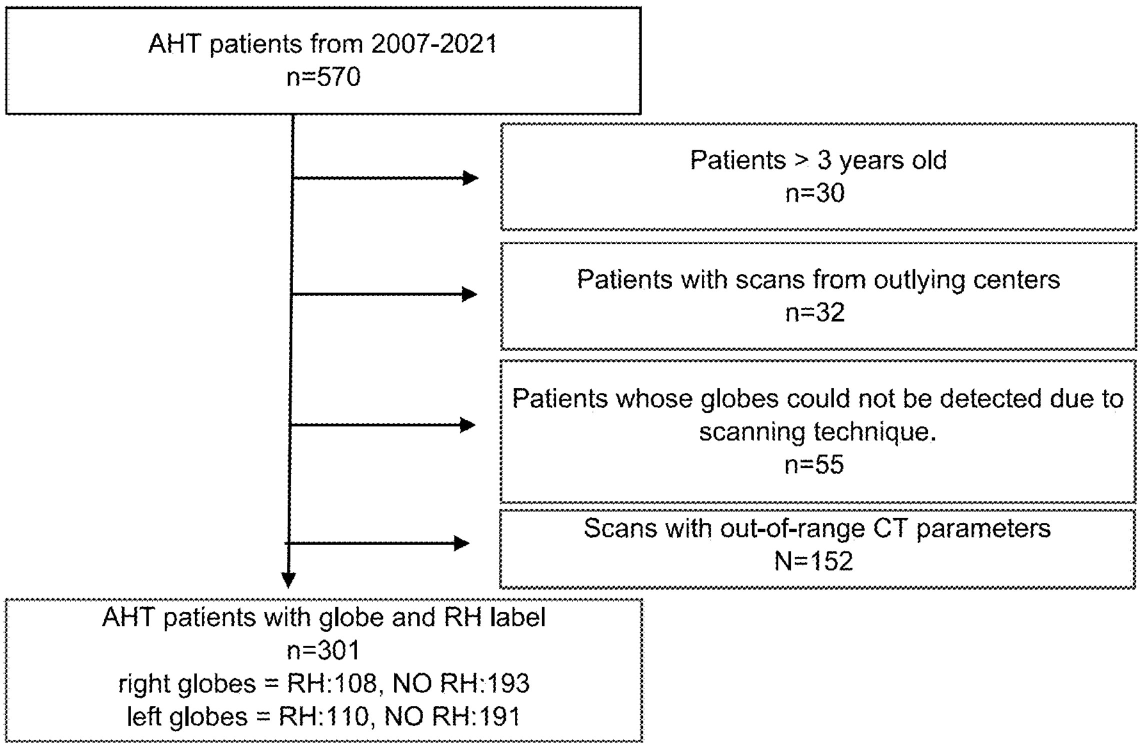
FIG. 1 shows the study cohort from an initial patient selection of 570 patients, with the exclusion of patients over three years old (30 patients), patients with scans from outlying centers (32 patients), patients whose globes could not be detected due to scanning technique (55 patients), and patients whose scans were out-of-range CT parameters (152 patients), leaving 301 patients. Of those final patients, their right globes and left globes were characterized as having either retinal hemorrhage (RH) or no retinal hemorrhage (NO RH) and tabulated.

This disclosure provides, with reference to the drawings, a comprehensive understanding of various embodiments of the present disclosure as defined by claims. This disclosure provides a method and system for classifying retinal hemorrhages using computed tomography.

Development of the disclosed method and system required a series of technical advancements. First, an adult globe segmentation protocol was adapted to pediatric head CTs. Then, a novel way of normalizing the orientation of head CT images was created, which is a pre-image processing step that can be valuable to radiologists for all head CTs and MRIs with integration into currently existing software systems. Finally, regions of interest were isolated before identifying unique, predictive imaging features.

In one embodiment, a method for detecting retinal hemorrhage based on deep learning, comprising acquiring an axial series of images from a computed tomography scan of a patient's head; identifying and segmenting the patient's ocular globes using a deep-learning model in each axial image; rotating each axial image using the angle between the segmented globes; extracting the segmented globes from the remainder of each rotated axial image by cropping and masking the segmented globes; stacking the extracted segmented globes to form an individual three-dimensional segmented globe image for each patient eye; and assessing the three-dimensional segmented globe image for each eye for the abnormalities indicative of retinal hemorrhage.

In another embodiment, the step of rotating each axial image is performed using an automated algorithm that calculates the rotation angle based on the relative positions of the segmented globes. Those axial images may be reoriented to align the segmented ocular globes horizontally for consistent analysis.

In another embodiment, image processing techniques are applied to enhance the visibility of retinal structures in the CT scans.

In another embodiment, the three-dimensional segmented globe image is created using a stacking process that involves aligning the segmented globes in a predefined orientation to facilitate consistent analysis across different patient scans.

In another embodiment, the deep learning model assesses the presence of retinal hemorrhages with a sensitivity of no less 79% and specificity of no less than 79%.

In another embodiment, the detection of retinal hemorrhages aids in the diagnosis of conditions such as abusive head trauma in patients.

In one embodiment, a system for detecting retinal hemorrhages comprising a CT scanner and a computing device equipped with a deep learning model trained to identify retinal hemorrhages from CT scans is provided. In a further embodiment, the deep learning model includes an algorithm for segmenting ocular globes from the CT scans.

EXAMPLES

The following methods were used to conduct the experiments described in Examples 1-3 below:

globes with RH, and 384 globes without RH. Of one hundred twenty scans with RH on fundoscopic exams, three scans were read as having RH correctly, and one was read as "atypical for RH" in one globe while the patient had bilateral RHs, suggesting a 2.9% baseline sensitivity for CT scans read by pediatric radiologists.

TABLE 1

Baseline characteristics of the study cohort by patient

| | Total (N = 301) | | RH (N = 120) | | NO RH (N = 181) | | p- |
|---|---|---|---|---|---|---|---|
| Study cohort | N | % | N | % | N | % | value |
| **Sex** | | | | | | | |
| Female | 114 | 37.87 | 50 | 41.67 | 64 | 35.36 | 0.27 |
| Male | 187 | 62.13 | 70 | 58.33 | 117 | 64.64 | |
| **Race** | | | | | | | |
| White | 113 | 37.54 | 47 | 39.17 | 66 | 36.46 | 0.22 |
| Black or African American | 156 | 51.83 | 57 | 47.50 | 99 | 54.70 | |
| Hispanic | 9 | 2.99 | 2 | 1.67 | 7 | 3.87 | |
| Asian | 3 | 1.00 | 1 | 0.83 | 2 | 1.11 | |
| Other | 20 | 6.64 | 13 | 10.83 | 7 | 3.87 | |
| **Standard CT findings *** | | | | | | | |
| Hypoxic Ischemic Injury | 15 | 4.98 | 6 | 5.00 | 9 | 4.97 | 0.98 |
| Cerebral Infarction | 2 | 0.66 | 1 | 0.83 | 1 | 00.55 | 0.78 |
| Subdural | 222 | 73.75 | 114 | 95.00 | 108 | 59.67 | <0.01 |
| Epidural | 35 | 11.63 | 0 | 0 | 35 | 19.34 | <0.01 |
| Subarachnoid | 58 | 19.27 | 20 | 16.67 | 38 | 20.99 | 0.37 |
| IPH | 13 | 4.32 | 4 | 3.33 | 9 | 4.97 | 0.48 |
| | Median | Range | Median | Range | Median | Range | |
| Age (months) | 4.6 | 0.1-35.8 | 4.1 | 0.4-35.8 | 4.7 | 0.1-35.6 | 0.74 |

* CT finding percentages add to >100% because each patient can have more than one finding.

Study Cohort

All procedures for this study were approved by the University of Tennessee Health Science Center's Institutional Review Board (study number: 21-08123-XP, approval date: Jan. 20, 2022). Five hundred and seventy infants and young children were diagnosed with AHT by Le Bonheur Children's Hospital's child abuse team from May 2007-March 2021, on the basis of history, physical exam, laboratory and imaging studies, dilated fundoscopic exams, and other necessary investigations. Excluded patients were those patients that were over three years old (to increase the uniformity in globe size and developmental stage), those patients with scans from outlying centers, those patients for whom both globes could not be detected due to scan quality, and those patients with unusual CT parameters (explained below). Three hundred and one patients comprised the final study cohort (FIG. 1).

The presence or absence of retinal hemorrhages in each globe of each patient was tabulated based upon the results of dilated fundoscopic exams performed by our pediatric ophthalmology service. Of three hundred and one patients in the final study cohort (62.1% male, 51.8% Black, 37.5% White), 120 (39.9%) had RH in one or both globes. The median age of the patients was 4.6 (0.1-35.8) months. Age and race were equally distributed in both groups. More patients with RH had subdural hematomas (95.0% vs. 59.4%, p<0.01), whereas more patients without RH had epidural hematomas (0.0% vs. 19.4%, p<0.01) (Table 1). These differences were consistent with prior reports.[15] The cohort provided 218

The present invention will be further understood by reference to the following non-limiting examples. These examples are presented to provide those individuals possessing ordinary skill in the art a comprehensive disclosure and description of specific instances of how the compounds, compositions, articles, devices, and/or methods as claimed herein are made and evaluated. These examples are purely illustrative of the invention and are not intended to impose limitations on the scope of what the inventors consider their invention. It is important for those skilled in the art to recognize, in view of the present disclosure, that numerous modifications can be implemented in the disclosed embodiments, while still achieving comparable or analogous outcomes, without deviating from the essence and breadth of the invention.

Example 1

Retinal Hemorrhage Prediction in Individual Globes Using Deep Learning

The axial series from the initial CT scan of each patient was used in the prediction models to conform to the requirement of the globe segmentation algorithm. Slices had a matrix size of 512×512 and an in-plane resolution of 0.2-0.5 mm. CT scans were acquired from a single scanner (Toshiba).

Medical image processing: A globe segmentation model (MRes-UNET2D) was employed that was previously developed by Umapathy et al. for adult CT scans.[9] Whereas both ocular globes were detected in most slices, a single globe was detected in a minority of slices due to patient positioning, which also caused each globe to be represented by a variable number of slices ranging from three to five. A novel method for straightening CT scans was developed, which was necessary for creating more uniform 3D renderings of globes for analysis in later steps. Procedures for this—as well as corrections for missed and mislabeled globe regions which resulted from the segmentation algorithm—are described as follows.

Figure 2:
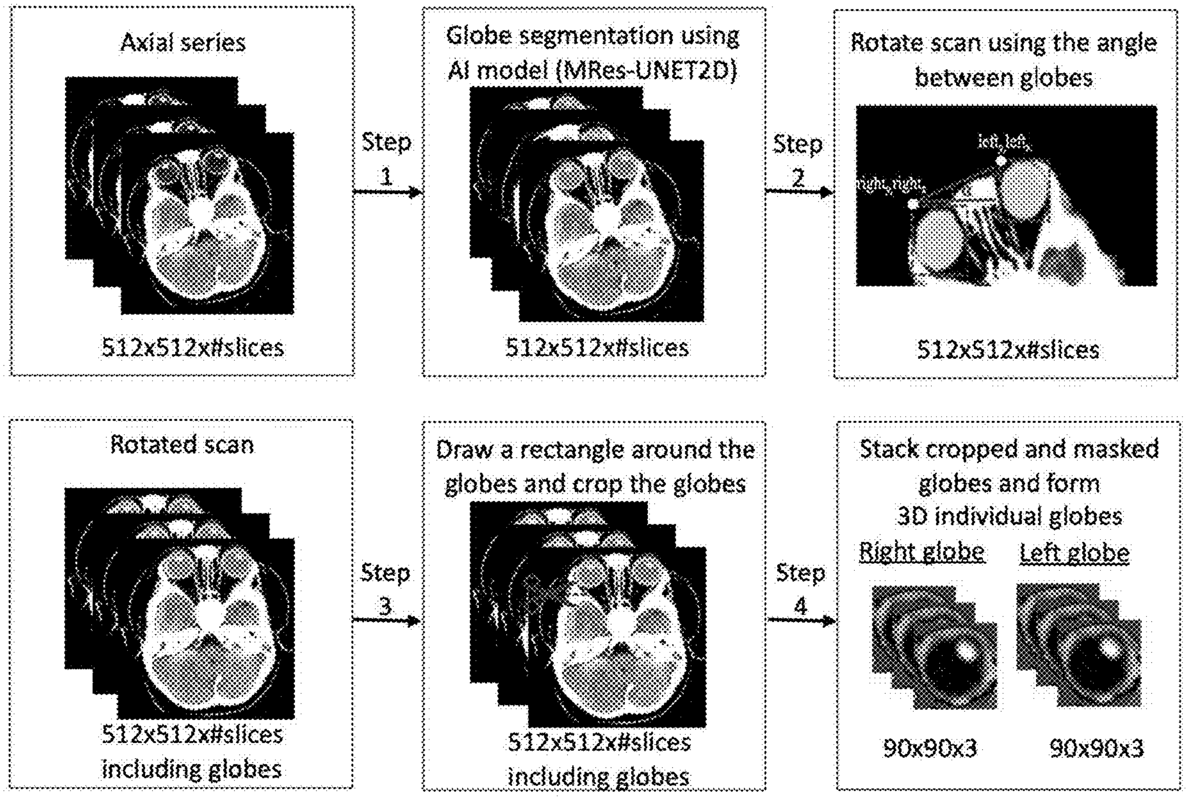
FIG. 2 shows the novel method for straightening CT scans through a series of medical imaging processing steps. A series of axial slices is taken through a series of steps. In step 1, globes are segmented using an AI model. Regions detected as a globe by the segmentation model are indicated in yellow. In step 2, the scan is rotated using the angle between the globes. In step 3, the rotated scan is straightened. In step 4, a rectangle is drawn around the globes and the image of the globes are cropped. In step 5, the cropped and masked globes are stacked to form 3D individual globes. Pixels of Hounsfield unit values less than-15 or greater than 90 (in red) are masked to focus analysis on the retina and vitreous. 3D refers to three-dimensional, AI refers to artificial intelligence.

In brief, the angle between the globes was calculated to straighten the scans, and scans were cropped to include missed and exclude mislabeled globe regions. Cropping also achieved our objectives of blinding the model to intracranial findings which are correlated with RH and reducing the amount of information being read by our deep learning algorithm. The medical imaging processing steps are depicted in FIG. 2.

Figure 3A:
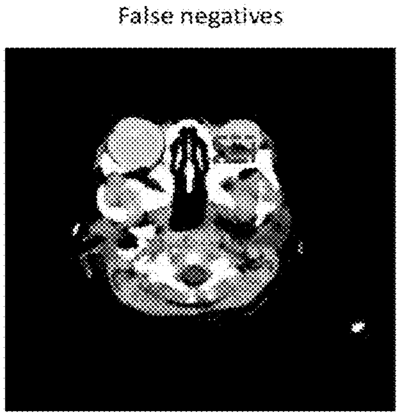
FIG. 3A and FIG. 3B show examples of missed and mislabeled globes. The rectangle in FIG. 3A shows a globe region that was missed (globe false negative). The rectangle in FIG. 3B shows a region of mislabeled globe (globe false positive).
Figure 3B:
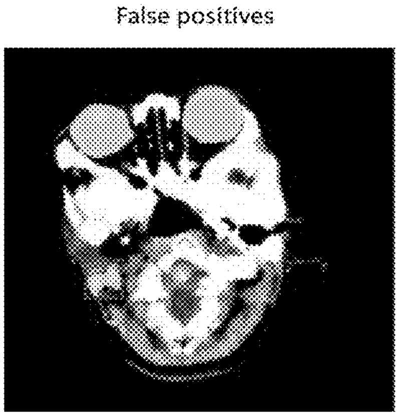

In some slices, pixels at the borders of a globe were missed (globe false negatives), causing the retina to be excluded. To circumvent this issue, we delineated a rectangle that extends outside of the predicted globe by using the maximum 'x' and 'y' dimensions of the globe, and then used all pixels contained therein for our modeling. In other slices, the globe segmentation model mislabeled regions of brain posteriorly or soft tissues anteriorly (globe false positives). To compensate, we cropped the anterior ⅓ of each slice for the globe detection step, and thresholded them for the density of connected pixels predicted as globe. The latter step was effective since the regions of true globe had significantly higher densities than the false positive regions. Examples of missed and mislabeled globe regions are illustrated in FIG. 3A and FIG. 3B respectively.

In one embodiment, a novel technique for automatically straightening CT scans is utilized. The globe rectangles differed in size among patients as the heads of some patients were tilted. To make the rectangle sizes similar across patients, a novel method for rotating the original slices from all scans was developed. For each scan, the slice with the largest number of pixels predicted as globe was selected. The rotation angle (a) was calculated using the left upper corners of the right and left globe rectangles. The whole scan was rotated using the tangent of the angle, either clockwise or counterclockwise depending upon if the patient's head was tilted to the left or right on the scan image itself (FIG. 4). Then globe segmentation was performed once again on the straightened images.

To create a 3D rendering of each globe, the smallest square that included the entire globe in each individual slice was first determined, and then assigned coordinated dimensions to a box corresponding to the largest of these squares. These boxes varied in size across samples; therefore, their dimensions were fixed to 90×90 using zero-padding. The pixels outside the HU range −15 to 90 were replaced with zero to get the region of interest that includes the retina and vitreous alone. The three cropped and masked images in which most of the globe is seen were stacked to form a 3D image with size 90×90×3. Finally, the pixel values of individual globes were scaled from 0 to 1 using min-max scaling.

After globe segmentation, globes with and without RH were compared to see if their Hounsfield unit (HU) distributions varied according to CT parameters (FIG. 5A and FIG. 5B). The baseline CT parameters were set at intercept=0, WC=40-45, and WW-70-80, and excluded scans with intercept≠0, to homogenize pixel values for masking outside the retina and vitreous. All scans had a slice thickness of five millimeters. The distribution of these parameters in the final study cohort is included in Table 2.

TABLE 2

CT parameters of study cohort

| CT parameters | Study cohort (N = 301) NO RH | RH | Total |
|---|---|---|---|
| Slice Thickness | | | |
| 5 | 120 | 181 | 301 |
| WC-WW | | | |
| 40-70 | 149 | 99 | 248 |
| 40-80 | 23 | 17 | 40 |
| 45-75 | 7 | 6 | 13 |
| Intercept | | | |
| 0 | 120 | 181 | 301 |
| Total | 120 | 181 | 301 |

After modeling, saliency maps were created calculated by a smoothGrad approach to understand which regions of the globes most influenced the convolutional neural network (CNN) model predictions. In this approach, gradients of class probability scores are computed with respect to the input image pixels. Pixels that have the highest gradients have the highest influence on predictions. SmoothGrad reduces the effect of local variations in the gradients in order to improve visual coherence by adding noise to the input image for a given number of iterations and outputs the average of the gradients calculated for them.

Figure 6:
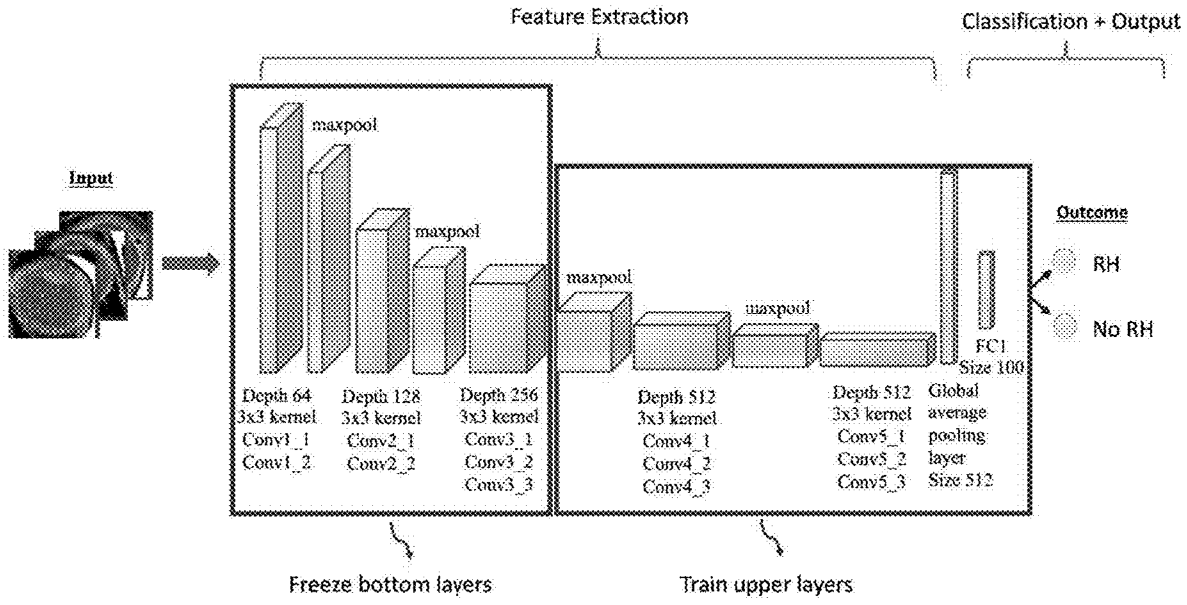
FIG. 6 shows the training architecture of the model, with trained upper layers on the right and frozen bottom layers on the left.

AI model and visual explanation using saliency maps: Transfer learning was applied by using a CNN model which was pre-trained on ImageNet-specifically the VGG16 model from the Keras library. The architecture of their feature extraction steps was used, and then a global average pooling layer and an output layer was added to their classification steps. The top layers of the network were retrained which capture more task specific features. The three bottom convolutional blocks were frozen and the top two convolutional blocks were fine-tuned with a new dataset (FIG. 6).

The population of individual 3D globes were randomly split into training (60%), validation (20%) and testing (20%) datasets. Rotation, horizontal shift, horizontal flip and scaling were applied to create augmented data, and used these during training to improve the model further and reduce overfitting. After deciding on model hyperparameters such as the number of layers, regularization parameters, optimizers, etc. using the validation dataset, model performance was evaluated on the test dataset. Performance metrics included accuracy, sensitivity and specificity (with the F1 score maximized in the validation dataset), and area under the curve (AUC). All experiments were performed in Python using the Keras library and a single Tesla V100 (NVIDIA) GPU node with 32-GB RAM.

Performance of the AI model: RH was predicted in individual ocular globes with a sensitivity of 79.6%, specificity of 79.2% and an AUC of 0.83 (CI95% 0.75-0.91) in the test dataset. The positive predictive value was 68.6%, negative predictive value was 87.1%, and accuracy was 79.3% (Table 3).

TABLE 3

Confusion matrix for detection of retinal hemorrhages using the AI model

| | | Predicted | | |
|---|---|---|---|---|
| | | No RH | RH | |
| Actual | No RH | True negatives 61 | False positives 16 | Specificity 79.2% |
| | RH | False negatives 9 | True positives 35 | Sensitivity 79.6% |
| | | Negative predictive value 87.1% | Positive predictive value 68.6% | Accuracy 79.3% |

The AI model was able to classify retinal hemorrhages on globes from routine pediatric head CTs with a sensitivity of 79.6%, specificity of 79.2% and AUC of 0.83 (CI95% 0.75-0.91). It is notable that these results were not based upon focused globe sequences or specialized AHT protocols. Furthermore, as RHs are commonly bilateral (81.7% in the described cohort), an AI model is likely to perform better at a CT-level because the model would have two chances to predict RH. The performance of the presently disclosed method using a supervised model indicates that RH information is accessible on head CTs, and AI-image analysis can increase the sensitivity and specificity of this imaging modality for AHT. The disclosed model performed considerably better (AUC 0.94) on "larger" to the CT machine globes of sizes >75×75 pixels. Because these globe sizes were not related to patient age, the CT scanning technique is believed to allow more information to be contained in these images.

There have been no prior reports that have attempted to detect RH on pediatric head CTs. In adults, Terson's Syndrome (rare vitreous, pre-retinal, or retinal hemorrhage in the setting of severe subarachnoid hemorrhage) can be observed by expert clinicians as a "crescent sign" in the posterior pole of the globe on CT. Clinicians were able to detect Terson's Syndrome on head CTs compared to fundoscopic exams with sensitivities of 32-50% and specificities of 95-98%.[16-18]

The AI model performance can also be compared to how well RHs are detected on magnetic resonance imaging (MRI), which Beavers et al. correlated with graded retinal exams.[19] These authors found MRIs read by neuroradiologists to have a detection sensitivity of 61% and a specificity 100%. Notably, 76% of high-grade hemorrhages were detected whereas only 14% of low-grade hemorrhages were detected, indicating that the severity of hemorrhage is a relevant factor. The sensitivity of the model described herein exceeded this considerably.

Deep learning AI has been used to detect and classify intracranial hemorrhage subtypes in adults. Burduja et al. used a training dataset of >21,000 scans and were able to achieve sensitivities of 0.4-0.94, specificities of 0.93-0.99, and AUCs 0.90-0.94 for the hemorrhage subtypes.[5] Ye et al. trained on 194 scans to classify the same intracranial hemorrhage subtypes and achieved AUCs >0.8 and specificities >0.8, but had low sensitivities for subarachnoid and epidural hemorrhages of 0.69.[6] The classification models from both performed on par with experienced neuroradiologists. The performance for classifying the presence or absence of RH after training the model on 180 scans fell within the range of these studies while detecting a pathology that is generally invisible to the naked eye.

To understand which regions of the ocular globes most influenced the predictions of the present deep learning CNN model, saliency maps were created calculated by a smoothGrad approach.[10-12] The model focused variably on the following regions: (1) the posterior globe where retina is present; (2) the anterior globe where lens, pupil and iris are present; and/or (3) the mid-globe vitreous.

Figure 7:
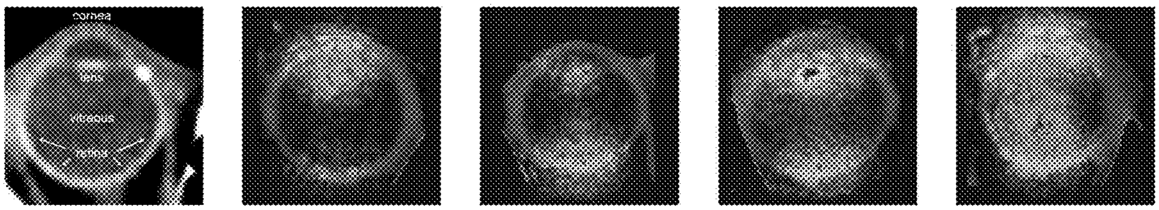
FIG. 7 shows the saliency maps of the important regions of the globe where (1) the posterior globe where retina is present; (2) the anterior globe where lens, pupil and iris are present; and/or (3) the mid-globe vitreous. Pixels represent the parts of the images that most influenced the predictions.
Figure 8A:
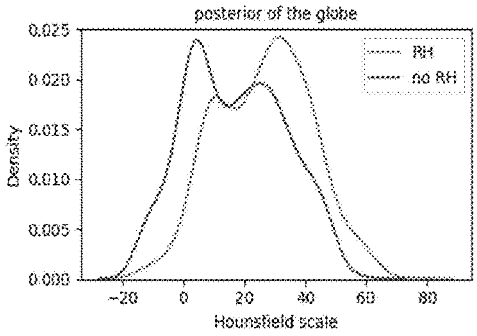
FIG. 8A and FIG. 8B show the Hounsfield (HU) scale values in cases and controls from the regions that were highly influential on predictions.
Figure 8B:
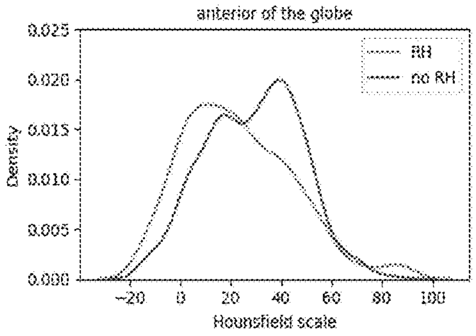
Figure 9:
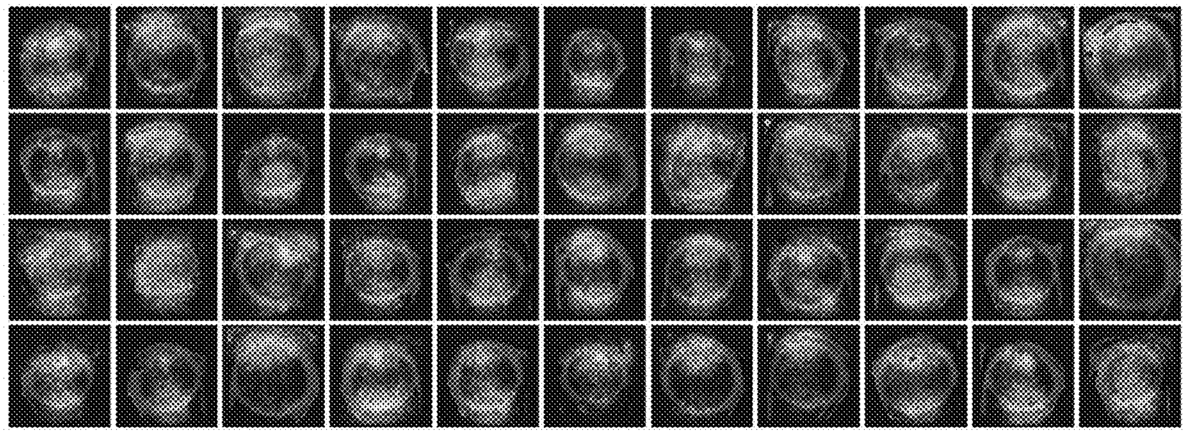
FIG. 9 shows saliency maps of globes with retinal hemorrhage (RH).
Figure 10:
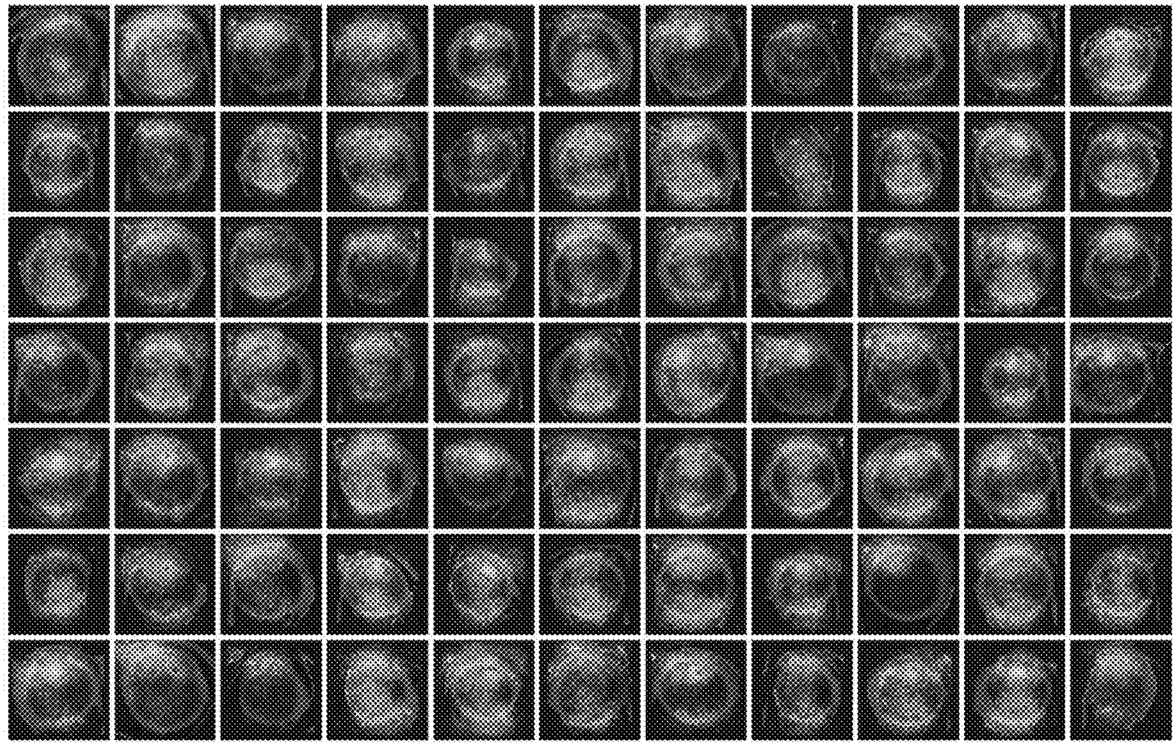
FIG. 10 shows saliency maps of globes without retinal hemorrhage (RH).

Saliency maps demonstrate that areas seemingly outside of the visible retina contributed heavily to model predictions in many instances (FIG. 7). This may be due to blood elements in the vitreous, inclusion of the information in the far retinal wall in certain slices, or other visibly inapparent changes in the vitreous and other ocular structures. Four important region patterns are highlighted by saliency maps in FIG. 7, with red pixels representing the parts of the images which most influenced the predictions. The distributions of HU values in cases and controls from regions that were highly influential on predictions (grad≥0.8) were compared. In the posterior globe, the model highlighted higher HU values consistent with blood (40-60) in positive cases, and lower HU values around zero in negative cases (FIG. 8A). The opposite was true for the anterior globe (FIG. 8B). Saliency maps for all samples with and without RH in the test dataset are provided in FIG. 9 and FIG. 10, respectively.

Example 2

Subgroup Analysis of Retinal Hemorrhage Prediction in Individual Globes Using Deep Learning The median globe size of the entire cohort was 72×73 pixels. The highest increase in performance occurred in the subgroup which contained globe sizes larger than 75×75 pixels, which had a median size of 79×79 pixels. The sensitivity, specificity, and AUC (CI95%) in this subgroup was 92.3%, 83.9%, and 0.94 (0.86-1.0) (Table 4). The performance on the remaining globes, which had a median size of 70×71 pixels, was 74.2%, 78.3%, and 0.75 (CI95% 0.63-0.87). Larger globe size on CT was related to scanning technique and not to the age of the patient. The model performance in patients <6 months old was 84.6%, 80.5%, and 0.88 (CI95% 0.79-0.97), compared to patients >6 months old, which was 72.2%, 77.8%, and 0.75 (CI95% 0.59-0.90).

TABLE 4

Performance of the AI model in different test dataset subgroups

| Performance across subgroups | RH | No RH | Accuracy | Sensitivity | Specificity | AUC |
|---|---|---|---|---|---|---|
| Full test dataset | 44 | 77 | 79.3% | 79.6% | 79.2% | 0.83 (0.75-0.91) |
| Age ≤ 6 months | 26 | 41 | 82.1% | 84.6% | 80.5% | 0.88 (0.79-0.97) |

TABLE 4-continued

Performance of the AI model in different test dataset subgroups

| Performance across subgroups | RH | No RH | Accuracy | Sensitivity | Specificity | AUC |
|---|---|---|---|---|---|---|
| Age > 6 months | 18 | 36 | 75.9% | 72.2% | 77.8% | 0.75 (0.59-0.90) |
| Globe size ≥ (75, 75) | 13 | 31 | 86.4% | 92.3% | 83.9% | 0.94 (0.86-1.0) |
| Globe size < (75, 75) | 31 | 46 | 76.6% | 74.2% | 78.3% | 0.75 (0.63-0.87) |

Example 3

Retinal Hemorrhage Prediction in Patients Using Demographic Characteristics and Intracranial Pathological Findings (Standard CT Model)

To compare the AI model with the ability of typical head CT findings in AHT to predict RH, four common intracranial pathologies read by radiologists were used as features (subdural hematoma, epidural hematoma, subarachnoid hemorrhage, and hypoxic ischemic injury), along with the demographic features age, race, and sex (Standard CT model). Categorical features were aggregated as counts and percentages, and continuous features were summarized as median (range). A p-value <0.05 was considered statistically significant for comparing cases and controls. A light gradient boosting machine (LightGBM) model was developed, which is a tree-based ensemble method, using these features. A "positive" scan was one in which at least one globe had RH. Shapley additive explanation (SHAP) was used to understand the relationships between the clinical features and RH.[14]

Figure 11A:
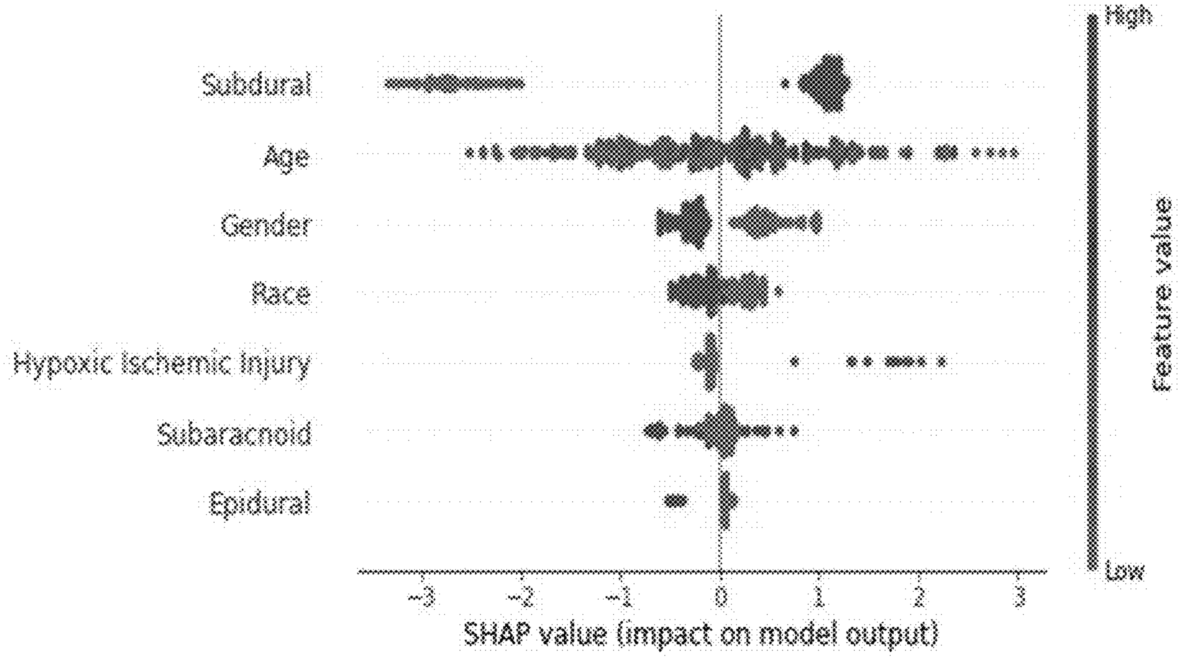
FIG. 11A and FIG. 11B show summary plots of the performance of the standard CT model (FIG. 11A) and the AI plus standard CT model (FIG. 11B) of the predictive value on a number of clinical features.
Figure 11B:
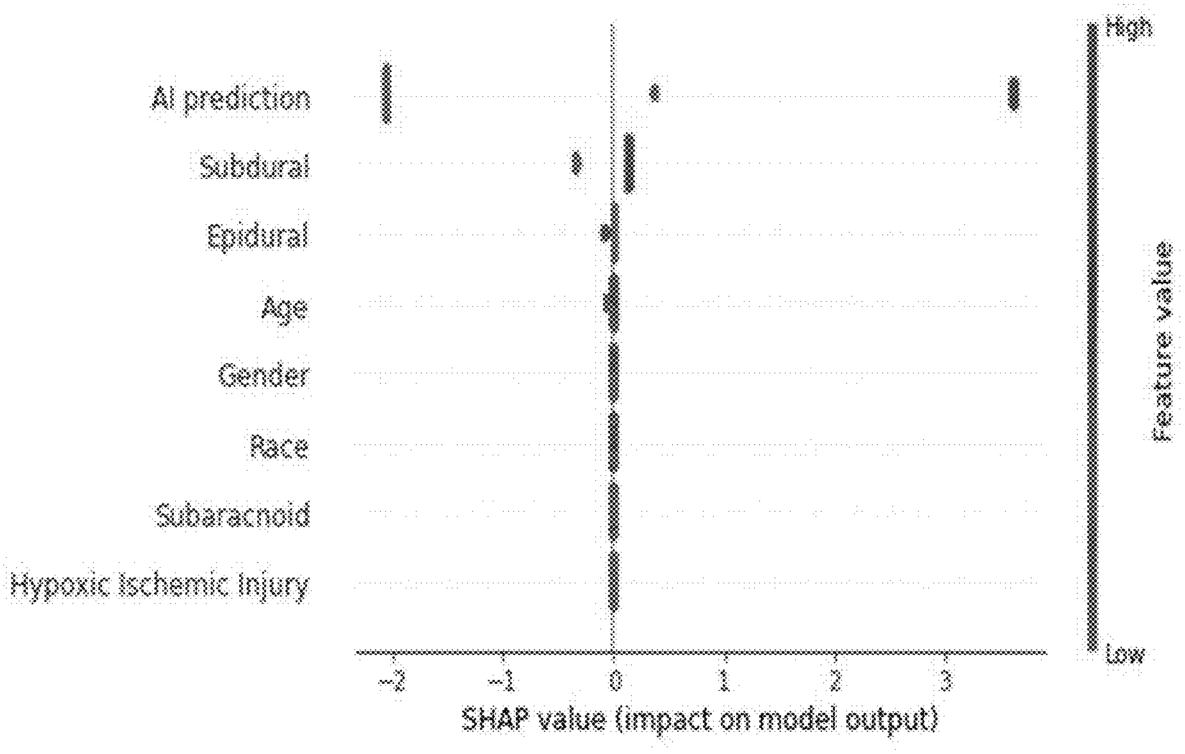

Performance of the Standard CT model: RH was predicted on the level of scans with a sensitivity of 79.2%, specificity of 72.2%, and an AUC of 0.80 (CI95% 0.69-0.91) on the test dataset. The most important clinical features predicting RH was subdural hematoma, followed by age and race. The risk of RH was higher in patients with subdural hematomas and hypoxic ischemic injury, while it was lower in patients with epidural hematoma. White or female patients had a higher risk of RH compared to Black patients or males (FIG. 11A).

Example 4

Retinal Hemorrhage Prediction in Individual Globes Using the Combined AI Model and Standard CT Findings Predicted risks obtained from the AI model along with the three demographic features and four intracranial findings of the Standard CT model were used to develop a LightGBM model. Performance and the relative contributions of the features were assessed on the level of individual globes.

Performance of the combination AI model with standard CT model: RH was predicted on the level of globes with a sensitivity of 79.6%, specificity of 80.5%, and an AUC of 0.86 (CI95% 0.79-0.93) on the test dataset. Intracranial findings which influenced the Standard CT model most lost their importance along with gender and race after the AI model's risk prediction was included as a feature (FIG. 11A). The model for RH prediction based on common CT findings performed similarly to the AI model, with subdural hematoma being the most important feature influencing prediction. Standard CT findings did not increase the performance of the present AI model, demonstrating the model can function based upon its unique features alone.

The various features and processes described above may be used independently of one another or may be combined in various ways. All possible combinations and subcombinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The terms artificial intelligence (AI) model and deep learning model are used synonymously throughout this specification.

Whereas certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

REFERENCES

1. Letson M M, Cooper J N, Deans K J, et al. Prior opportunities to identify abuse in children with abusive head trauma. *Child Abuse Negl.* 2016; 60:36-45. doi: 10.1016/J.CHIABU.2016.09.001
2. Binenbaum G, Mirza-George N, Christian C W, Forbes B J. Odds of abuse associated with retinal hemorrhages in children suspected of child abuse. *Journal of AAPOS.* 2009; 13(3):268-272. doi: 10.1016/j.jaapos.2009.03.005
3. Ip S S, Zafar S, Liu T Y A, et al. Nonaccidental trauma in pediatric patients: evidence-based screening criteria for ophthalmologic examination. *Journal of AAPOS.* 2020; 24(4):226.e1-226.e5. doi:10.1016/j.jaapos.2020.03.012
4. Casar Berazaluce A M, Moody S, Jenkins T, et al. Catching the red eye: A retrospective review of factors associated with retinal hemorrhage in child physical abuse. *J Pediatr Surg.* 2021; 56(5): 1009-1012. doi: 10.1016/j.jpedsurg.2020.07.031
5. Burduja M, Ionescu R T, Verga N. Accurate and efficient intracranial hemorrhage detection and subtype classification in 3D CT scans with convolutional and long short-term memory neural networks. *Sensors* (*Switzerland*). 2020; 20(19): 1-21. doi: 10.3390/s20195611
6. Ye H, Gao F, Yin Y, et al. Precise diagnosis of intracranial hemorrhage and subtypes using a three-dimensional joint convolutional and recurrent neural network. *Eur Radiol.* 2019; 29(11):6191-6201. doi: 10.1007/s00330-019-06163-2
7. Hale A T, Stonko D P, Brown A, et al. Machine-learning analysis outperforms conventional statistical models and CT classification systems in predicting 6-month outcomes in pediatric patients sustaining traumatic brain injury. *Neurosurg Focus.* 2018; 45(5). doi:10.3171/2018.8.FOCUS17773
8. Sorensen J I, Nikam R M, Choudhary A K. Artificial intelligence in child abuse imaging. *Pediatr Radiol.* 2021; 51(6):1061-1064. doi:10.1007/s00247-021-05073-0
9. Umapathy L, Winegar B, Mackinnon L, et al. Fully automated segmentation of globes for volume quantification in CT images of orbits using deep learning. *American Journal of Neuroradiology.* 2020; 41(6): 1061-1069. doi: 10.3174/ajnr.A6538
10. Simonyan K, Vedaldi A, Zisserman A. Deep Inside Convolutional Networks: Visualising Image Classification Models and Saliency Maps. Published online Dec. 20, 2013. http://arxiv.org/abs/1312.6034
11. Zeiler M D, Fergus R. Visualizing and Understanding Convolutional Networks. Published online Nov. 12, 2013. http://arxiv.org/abs/1311.2901
12. Springenberg J T, Dosovitskiy A, Brox T, Riedmiller M. Striving for Simplicity: The All Convolutional Net. Published online Dec. 21, 2014. http://arxiv.org/abs/1412.6806
13. Ke G, Meng Q, Finley T, et al. *LightGBM: A Highly Efficient Gradient Boosting Decision Tree*. https://github.com/Microsoft/LightGBM.
14. Lundberg S M, Erion G, Chen H, et al. *Explainable AI for Trees: From Local Explanations to Global Understanding. Published online* May 11, 2019. http://arxiv.org/abs/1905.04610
15. Karibe H, Kameyama M, Hayashi T, Narisawa A, Tominaga T. Acute subdural hematoma in infants with abusive head trauma: A literature review. *Neurol Med Chir* (*Tokyo*). 2016; 56(5):264-273. doi: 10.2176/nmc.ra.2015-0308
16. Koskela E, Pekkola J, Kivisaari R, et al. Comparison of CT and clinical findings of Terson's syndrome in 121 patients: a 1-year prospective study. *J Neurosurg.* 2014; 120(5): 1172-1178. doi:10.3171/2014.2.JNS131248
17. Joswig H, Epprecht L, Valmaggia C, et al. Terson syndrome in aneurysmal subarachnoid hemorrhage-its relation to intracranial pressure, admission factors, and clinical outcome. *Acta Neurochir* (*Wien*). 2016; 158(6): 1027-1036. doi: 10.1007/s00701-016-2766-8
18. Bäuerle J, Gross N J, Egger K, et al. Terson's Syndrome: Diagnostic Comparison of Ocular Sonography and CT. *Journal of Neuroimaging.* 2016; 26(2):247-252. doi: 10.1111/jon. 12285
19. Beavers A J, Stagner A M, Allbery S M, Lyden E R, Hejkal T W, Haney S B. MR detection of retinal hemorrhages: correlation with graded ophthalmologic exam. *Pediatr Radiol.* 2015; 45(9): 1363-1371. doi: 10.1007/s00247-015-3312-1
20. Orman G, Kralik S F, Meoded A, Desai N, Risen S, Huisman T A G M. MRI Findings in Pediatric Abusive Head Trauma: A Review. *Journal of Neuroimaging.* 2020; 30(1): 15-27. doi: 10.1111/jon.12670
21. Greiner M v., Berger R P, Thackeray J D, Lindberg D M. Dedicated Retinal Examination in Children Evaluated for Physical Abuse without Radiographically Identified Traumatic Brain Injury. *J Pediatr.* 2013; 163(2):527-531.e1. doi: 10.1016/j.jpeds.2013.01.063
22. Weiss R, He C H, Khan S, Parsikia A, Mbekeani J N. Ocular Injuries in Pediatric Patients Admitted With Abusive Head Trauma. *Pediatr Neurol.* 2022; 127: 11-18. doi:10.1016/j.pediatrneurol.2021.11.004
23. Narang S K, Fingarson A, Lukefahr J, et al. Abusive head trauma in infants and children. *Pediatrics.* 2020; 145(4). doi: 10.1542/PEDS.2020-0203/36936
24. Shorten C, Khoshgoftaar T M. A survey on Image Data Augmentation for Deep Learning. *J Big Data.* 2019; 6(1). doi: 10.1186/s40537-019-0197-0
25. Katie Albus. Technique Parameters and Anatomic Coverage: CT-Pediatric Chest Module (Revised Mar. 30, 2021). Accessed Nov. 28, 2022. https://accreditationsupport.acr.org/support/solutions/articles/11000049641-technique-parameters-and-anatomic-coverage-ct-pediatric-chest-module-revised-Mar. 30, 2021-
26. Hansen J B, Killough E F, Moffatt M E, Knapp J F. Retinal Hemorrhages: Abusive Head Trauma or Not? *Pediatr Emerg Care.* 2018; 34(9):665-670. doi:10.1097/PEC.0000000000001605
27. Binenbaum G, Chen W, Huang J, Ying G S, Forbes B J. The natural history of retinal hemorrhage in pediatric head trauma. *Journal of AAPOS.* 2016; 20(2):131-135. doi:10.1016/j.jaapos.2015.12.008

What is claimed is:

1. A method for detecting retinal hemorrhage based on deep learning, comprising: acquiring an axial series of images from a computed tomography scan (CT scans) of a patient's head;

identifying and segmenting the patient's ocular globes using a deep-learning model in each axial image;

rotating each axial image using an angle between the segmented globes;

extracting a subgroup of segmented globes by cropping and masking the segmented globes;

stacking the extracted subgroup of segmented globes to form an individual three-dimensional segmented globe image for each patient eye; and assessing the three-dimensional segmented globe image for each eye for abnormalities indicative of retinal hemorrhage.

2. The method of claim 1, wherein the step of rotating each axial image is performed using an automated algorithm that calculates the rotation angle based on the relative positions of the segmented globes.

3. The method of claim 2, wherein the CT scans are reoriented to align the segmented ocular globes horizontally for consistent analysis.

4. The method of claim 1, further including the step of applying image processing techniques to enhance the visibility of retinal structures in the CT scans.

5. The method of claim 1, wherein the three-dimensional segmented globe image is created using a stacking process that involves aligning the segmented globes in a predefined orientation to facilitate consistent analysis across different patient scans.

6. The method of claim 1, wherein the deep learning model assesses the presence of retinal hemorrhages with a sensitivity of no less 79% and specificity of no less than 79%.

7. The method of claim 1, wherein the detection of retinal hemorrhages aids in the diagnosis of abusive head trauma in patients.

* * * * *